United States Patent
Colvin et al.

(10) Patent No.: US 10,271,525 B2
(45) Date of Patent: Apr. 30, 2019

(54) BIRD FEEDER WITH IMPROVED RAIN SHIELD

(71) Applicant: Aspects, Inc., Warren, RI (US)

(72) Inventors: Barry D. Colvin, Rehoboth, MA (US); Jesse Faunce, Raynham, MA (US)

(73) Assignee: Aspects, Inc., Warren, RI (US)

( * ) Notice: Subject to any disclaimer, the term of this patent is extended or adjusted under 35 U.S.C. 154(b) by 148 days.

(21) Appl. No.: 15/194,814

(22) Filed: Jun. 28, 2016

(65) Prior Publication Data

US 2016/0374318 A1 Dec. 29, 2016

Related U.S. Application Data

(60) Provisional application No. 62/185,920, filed on Jun. 29, 2015.

(51) Int. Cl.
*A01K 39/02* (2006.01)
*A01K 39/014* (2006.01)

(52) U.S. Cl.
CPC ........ *A01K 39/0206* (2013.01); *A01K 39/014* (2013.01)

(58) Field of Classification Search
CPC .... A01K 39/0206; A01K 39/02; A01K 39/00; A01K 39/01; A01K 39/014
USPC .......................................................... 119/72
See application file for complete search history.

(56) References Cited

U.S. PATENT DOCUMENTS

| | | | | |
|---|---|---|---|---|
| 3,913,527 A * | 10/1975 | Kilham | ................ | A01K 39/014 119/74 |
| 4,019,462 A * | 4/1977 | Palfalvy | ............. | A01K 39/0206 119/51.5 |
| 4,030,451 A * | 6/1977 | Miller | ................ | A01K 39/0113 119/57.9 |
| 4,102,308 A * | 7/1978 | Kilham | ............. | A01K 39/0113 119/52.3 |
| 4,207,839 A * | 6/1980 | Barry | ................ | A01K 39/0113 119/57.9 |
| 4,821,681 A * | 4/1989 | Tucker | ............... | A01K 39/0113 119/51.01 |
| 5,191,857 A * | 3/1993 | Boaz | .................. | A01K 39/0113 119/52.3 |
| 6,932,023 B1* | 8/2005 | Nauert | ................... | A01K 39/00 119/61.5 |
| 7,162,975 B1* | 1/2007 | Nauert | ................ | A01K 39/014 119/72 |
| 2009/0031962 A1* | 2/2009 | Webber | ............. | A01K 39/0113 119/57.9 |
| 2011/0011345 A1* | 1/2011 | LoRocco | ............... | A01K 39/02 119/72 |
| 2011/0073043 A1* | 3/2011 | Dault | ................. | A01K 39/0113 119/57.9 |
| 2011/0271910 A1* | 11/2011 | Baynard | ............ | A01K 39/0113 119/51.5 |

* cited by examiner

*Primary Examiner* — Son T Nguyen
(74) *Attorney, Agent, or Firm* — Barlow, Josephs & Holmes, Ltd.

(57) ABSTRACT

The bird feeder provides a bird feeder with an improved rain shield that is removably supported above the reservoir of the feeder. A plug is secured to the hanger rod to support a rain shield above the base of a feeder while also allowing a user to pass the cover over the plug to access the reservoir in the base for access to the interior of the feeder, such as for adding more feed to the feeder and for cleaning.

10 Claims, 8 Drawing Sheets

BIRD FEEDER WITH IMPROVED RAIN SHIELD

CROSS-REFERENCE TO RELATED APPLICATION

This patent document claims priority to earlier filed U.S. Provisional Patent Application No. 62/185,920, filed on Jun. 29, 2015, the entire contents of which are incorporated herein by reference.

BACKGROUND OF THE INVENTION

1. Field of the Invention

This disclosure relates generally to bird feeders. More specifically, this disclosure relates to nectar feeders for birds, such as hummingbirds.

2. Background of the Related Art

Periodically, nectar feeders for hummingbirds require cleaning and refilling. This chore necessitates that the feeder be removed from its hanger and disassembled, washed and refilled with nectar. Washing is important to prevent or mitigate the growth of mold and bacteria, and also maintain the aesthetic appearance of the feeder. However, periodic cleaning and refilling may be discouraged by the owner if the disassembly and reassembly of the feeder is difficult or time consuming.

Therefore, there is a perceived need in the art to encourage owners of feeders to periodically clean their feeders by providing a feeder that is easy to disassemble and reassemble for cleaning and refilling that does not require the use of tools, extraordinary hand strength and that the overall difficulty of the task is minimized.

SUMMARY OF THE INVENTION

The feeder disclosed in this patent document provides a nectar bird feeder having a rain shield supported above a cover and a base, so both the rain shield and cover can each be removed from the feeder when a user wishes to refill the reservoir in the base.

Generally, the feeder includes a base with a bottom surface and a reservoir for containing nectar therein. The feeder also includes a hanger rod extending upwardly from the base. The feeder further includes a cover releasably attached to the base. A plug is secured to the hanger rod and positioned on the hanger rod so it can be used to support a rain shield above the base and the cover. The hanger rod includes a hook at its upper end so the feeder can be hung from a tree branch, another hook, or another structure.

When a user wishes to refill the reservoir in the base, for example by adding nectar in the case of a hummingbird feeder, the user disengages the hook from the structure from which the feeder is hung, and then the user removes the rain shield and the cover. The relative dimensions of the rain shield, the plug, the cover, and the hanger rod allow the user to remove the rain shield from the plug and pass it over the hanger rod, and then to remove the cover from the base and pass it over the plug and the hanger rod. During this step of refilling, the hanger rod remains connected to the base.

In one embodiment, the plug includes a stepped upper surface. The stepped upper surface is formed by a plug that has a plug main body and a plug protrusion extending upwardly from the plug main body. The plug main body has a plug main body diameter (first diameter), and the plug protrusion has a plug protrusion diameter (third diameter). The cover has a center aperture having a second diameter, which is greater than the first diameter, so the cover can pass over the plug when the plug is secured to the hanger rod and the hanger rod is connected to the base. This facilitates removal of the cover and repositioning of the cover onto the base of the feeder. The rain shield has a rain shield aperture defined therein. The rain shield aperture is dimensioned and configured to be secured to the plug protrusion by a friction fit.

Accordingly, among the objects of the instant invention are: the provision of a bird feeder with an improved rain shield; the provision of a feeder having a rain shield that is removably supported above the reservoir of the feeder; the provision of a hanger rod having a plug that supports a rain shield above the base of a feeder and that allows a user to pass the cover over the plug to access the reservoir in the base; the provision of a plug that provides a friction fit for a rain shield above a base and cover; and the provision of a rain shield that prevents rain from falling on the upper surface of the cover and on the central portion of the base. Other objects, features and advantages of the invention shall become apparent as the description thereof proceeds when considered in connection with the accompanying illustrative drawings.

BRIEF DESCRIPTION OF THE DRAWINGS

The novel features that are characteristic of the disclosed feeder are set forth in the appended claims. However, the feeder's preferred embodiment, together with further objects and attendant advantages, will be best understood by reference to the following detailed description taken in connection with the accompanying Figures in which:

DETAILED DESCRIPTION OF THE PREFERRED EMBODIMENT

Figure 1:
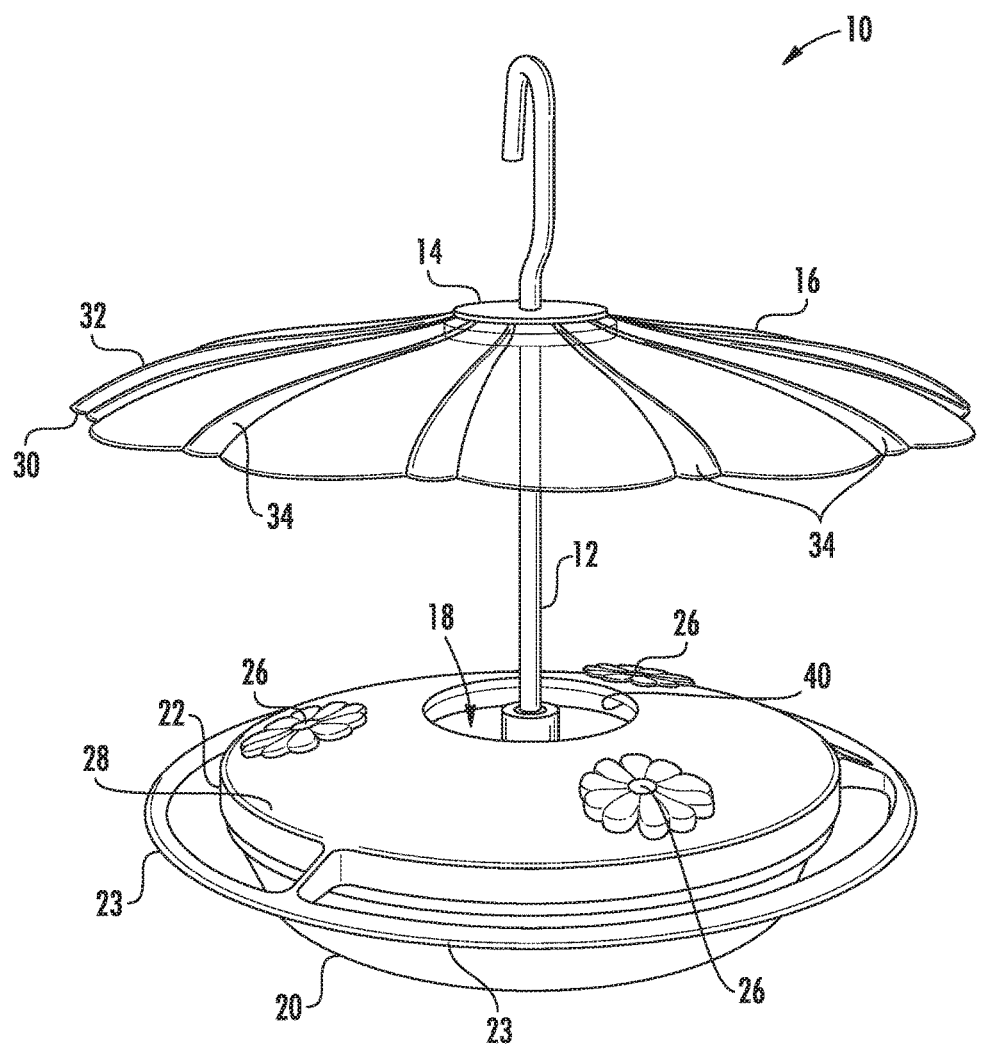
FIG. 1 is a perspective of an embodiment of the feeder with improved rain shield installed thereon.

Referring now to FIGS. 1-7, the feeder with improved rain shield of the instant invention is illustrated and generally at 10. As will hereinafter be more fully described, the feeder 10 includes a hanger rod 12 with a plug 14 that supports a rain shield 16 above a reservoir 18 in a base 20 of the feeder 10. The plug 14 allows the rain shield 16 to be removed from the feeder 10. The plug 14 also allows a cover 22 to be removed from the base 20, without removing the plug 14 from the hanger rod 12 and without removing the hanger rod 12 from the base 20 of the feeder 10.

Turning now to FIGS. 1-6, an embodiment of the feeder 10 is shown.

Referring first to FIG. 1, an embodiment of the feeder 10 is shown fully assembled. The feeder 10 includes a base 20 that has a bottom surface 24 and a reservoir 18 for containing nectar or another fluid therein. A hanger rod 12 is connected to the base 20 and extends upwardly from the base 20. A cover 22 is releasably attached to the base 20, so that a user can remove the cover 22 from the base 20 to refill the reservoir 18, to clean the reservoir 18, or to disassemble the feeder 10 for storage. Feed ports 26 are defined in the upper surface 28 of the cover 22 and extend through the cover 22. Each feed port 26 allows a bird to access the reservoir 18 through the cover 22. Several perches 23 may extend from the cover 22, adjacent to each feed port 26. Alternatively, the perches 23 may be configured to extend from the base 20. A plug 14 is secured to the hanger rod 12, such as by frictional engagement of the hanger rod 12 through a hole in the plug 14, and is positioned on the hanger rod 12 so that it is above the cover 22 when the cover 22 is attached to the base 20. Thus, it is possible that the plug 14 can be removably secured to the hanger rod 12. Alternatively, it may be permanently secured to the hanger rod 12. For example, the plug 14 can be glued to the hanger rod 12. Thus, a rain shield 16 is removably supported by the plug 14.

In embodiments not shown, the plug 14 could extend further along the hanger rod 12, as long as the plug 14 extends at least partially above the cover 22 when the cover 22 is attached to the base 20 so an upper surface 30 of the plug 14 is useful for supporting the rain shield 16 above the cover 22.

Figure 2:
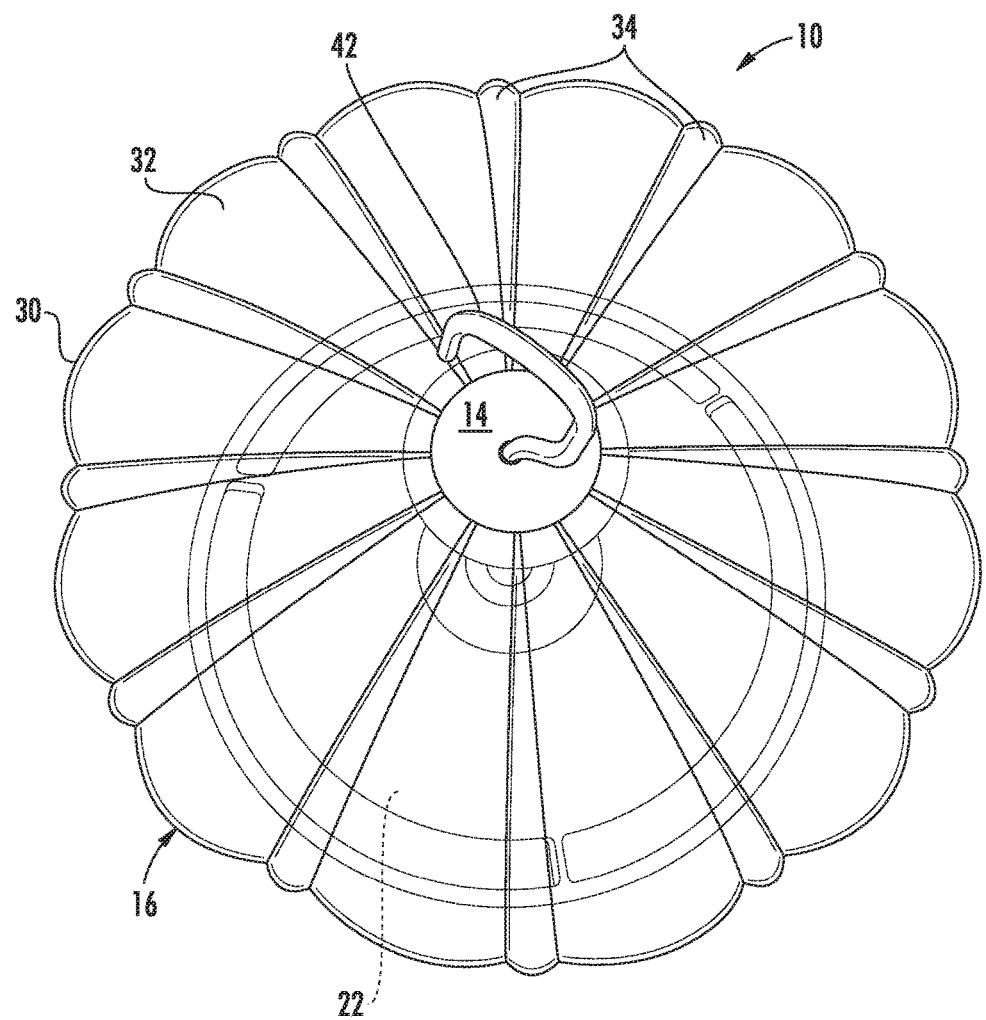
FIG. 2 is an upper perspective view thereof.

FIGS. 1 and 2 show that the rain shield 16 has an outer peripheral edge 30 that extends further outwardly in a horizontal direction than the outer diameter of the cover 22. The rain shield 16 has a convex upper surface 32 so the rain shield 16 is in the form of a dome. The rain shield 16 has optional reinforcing ribs 34 extending radially from the center of the rain shield 16 towards the peripheral edge 30 of the rain shield 16. The ribs 34 may also be merely ornamental as well. When the rain shield 16 is supported by the plug 14, as shown in FIG. 1, the rain shield 16 extends horizontally or at least substantially horizontally.

Figure 3:
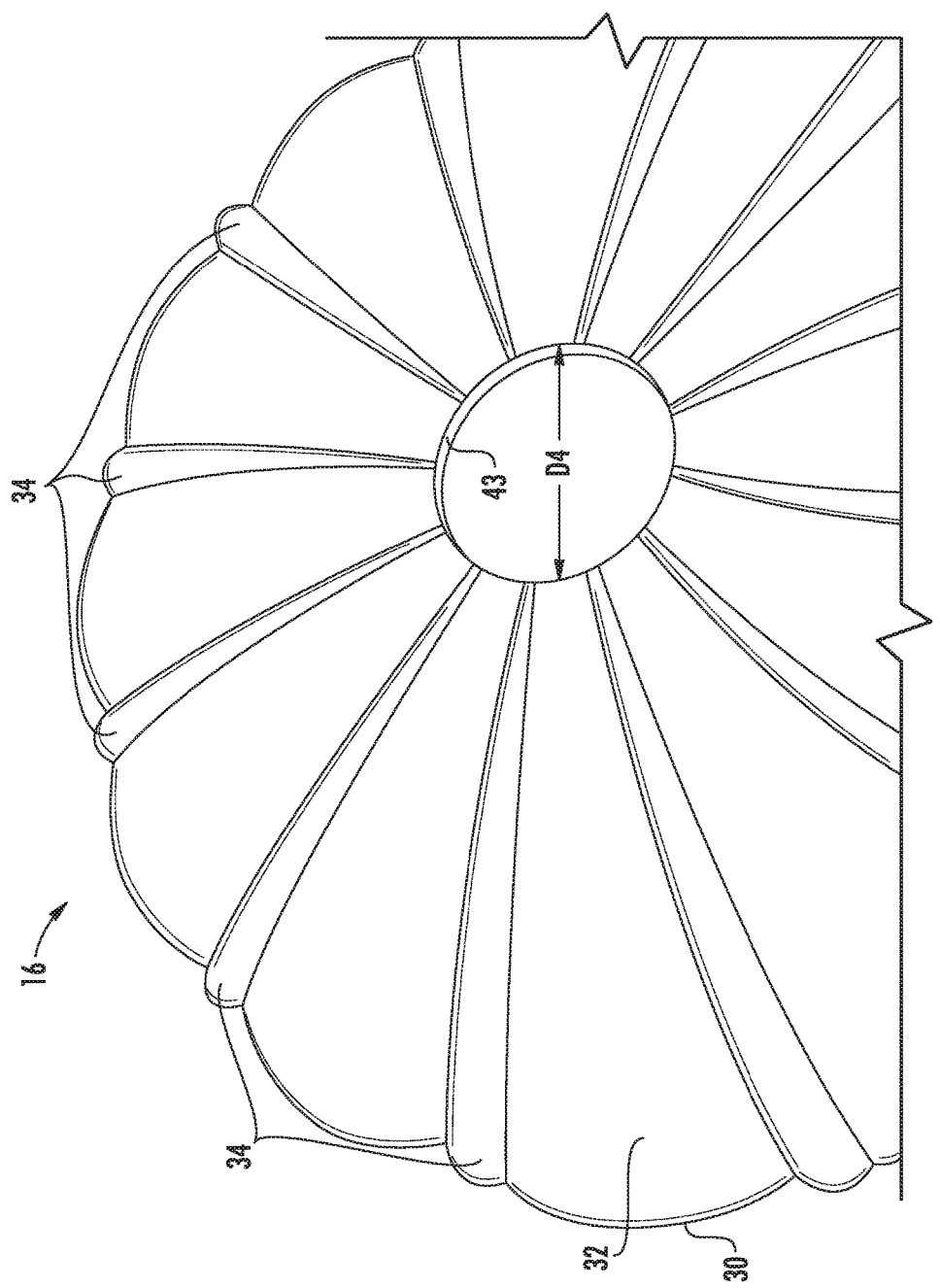
FIG. 3 is an upper perspective view of the rain shield of the feeder.

FIG. 3 shows the rain shield 16 after it has been removed from the feeder 10. The rain shield 16 may be translucent, solid or clear and made of any type of material. For example, the rain shield 16 may be made of translucent, colored plastic. Other materials, such as metal, are possible, as desired depending on the environment and needs of the feeder at hand.

Figure 4:
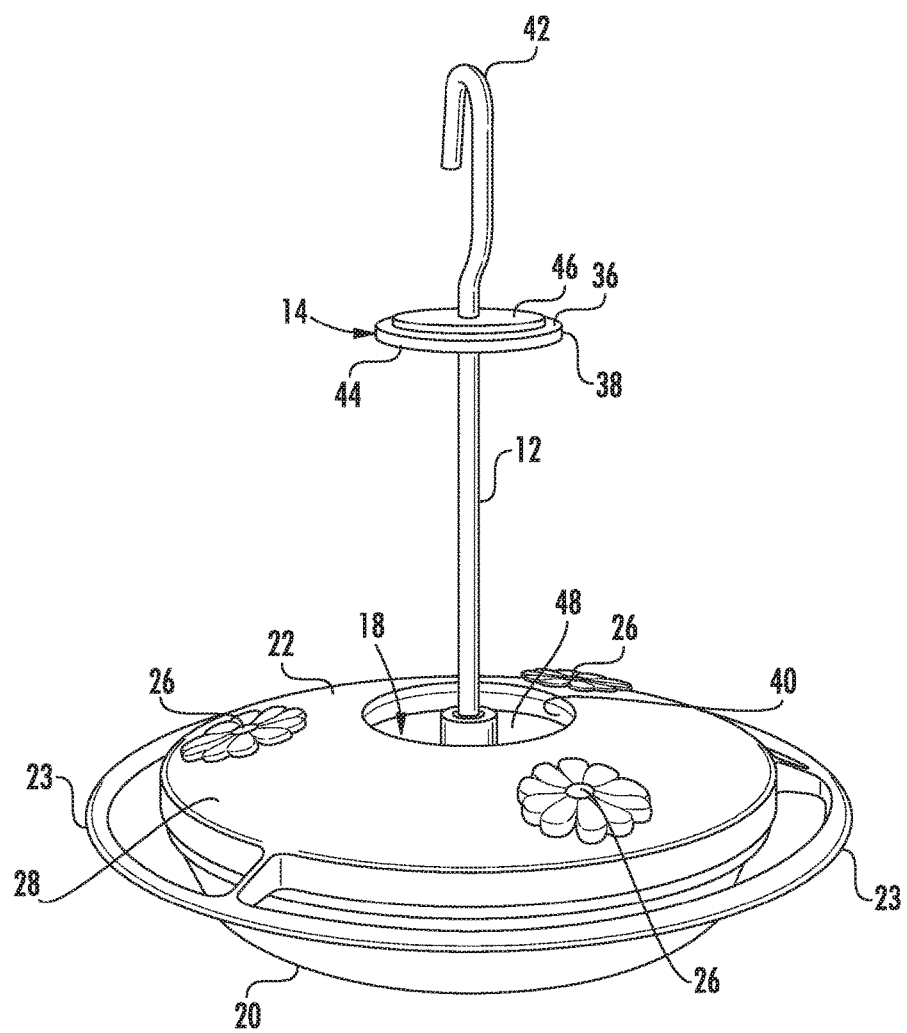
FIG. 4 is a perspective view of the feeder, with the rain shield removed.

FIG. 4 shows the feeder 10 after the rain shield 16 has been removed. The upper or shoulder surface 36 of the plug 14 is visible in FIG. 4. The shoulder surface 36 supports the rain shield 16.

Figure 5:
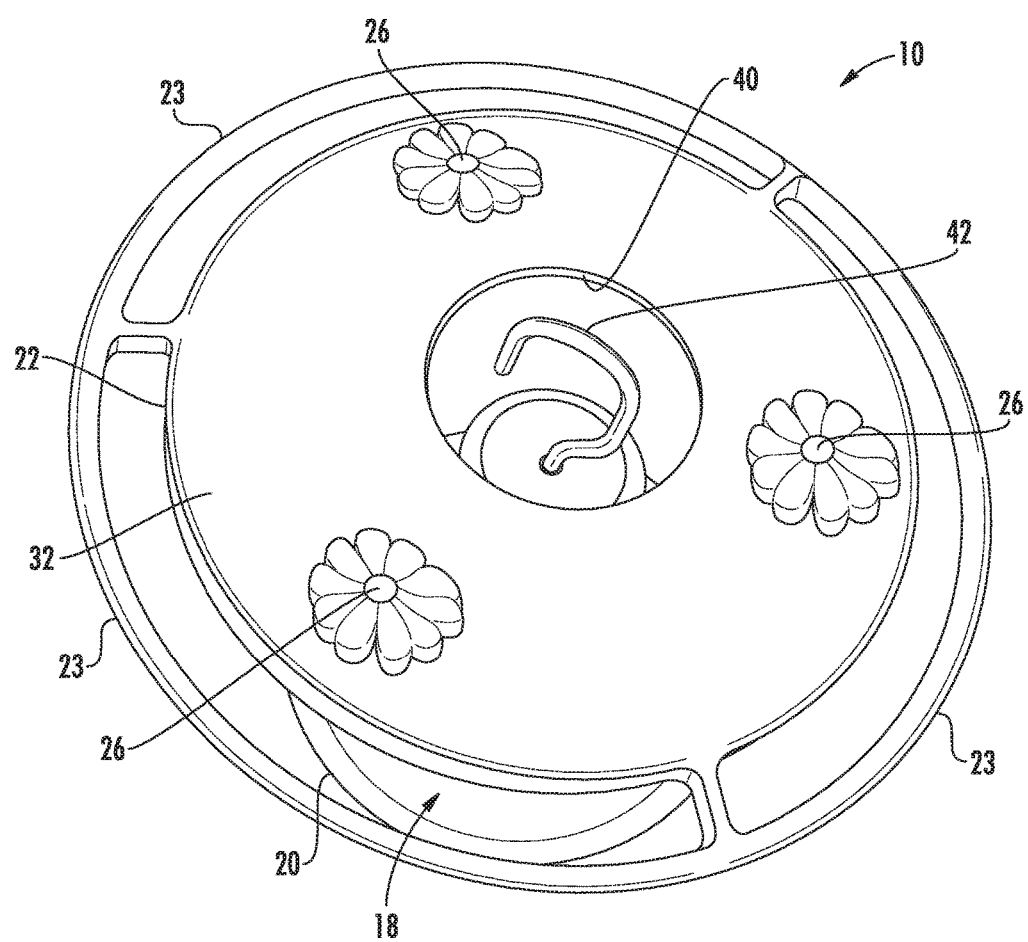
FIG. 5 is an upper perspective view of the step of removing the cover from the feeder.

The plug 14 has a peripheral edge 38, and a center aperture 40 is defined on the cover 22 at the center of the cover 22. The peripheral edge 38 of the plug 14 and the center aperture 40 of the cover 22 are dimensioned and configured so that the cover 22 can be removed from the feeder 10 while the hanger rod 12 is secured to the base 20 and while the plug 14 is still secured to the hanger rod 12. FIG. 5 shows the removal of the cover 22 from the feeder 10 while the hanger rod 12 is secured to the base 20 and while the plug 14 is secured to the hanger rod 12. It should be noted that the cover 22 is installed, such as after cleaning, in reverse fashion.

The plug 14 has a preferably circular peripheral edge 38 having a first diameter D1. A center aperture 40 is defined in the cover 22, and the center aperture 40 has a second diameter D2. The second diameter D2 is greater than the first diameter D1, so the cover 22 can be passed over the plug 14 when assembling or disassembling the feeder 10. For example, the cover 22 can be removed from the feeder 10 without removing the hanger rod 12 and plug 14 from the base 20, and without removing the plug 14 from the hanger rod 12 and base 20. It should be noted that the apertures 40 and plug 14 can be of any shape, such as a triangle or square, as an alternative to the preferred circular configuration shown.

As an example, the second diameter is 1.75 inches, and the first diameter is no greater than 1.5 inches.

Figure 6:
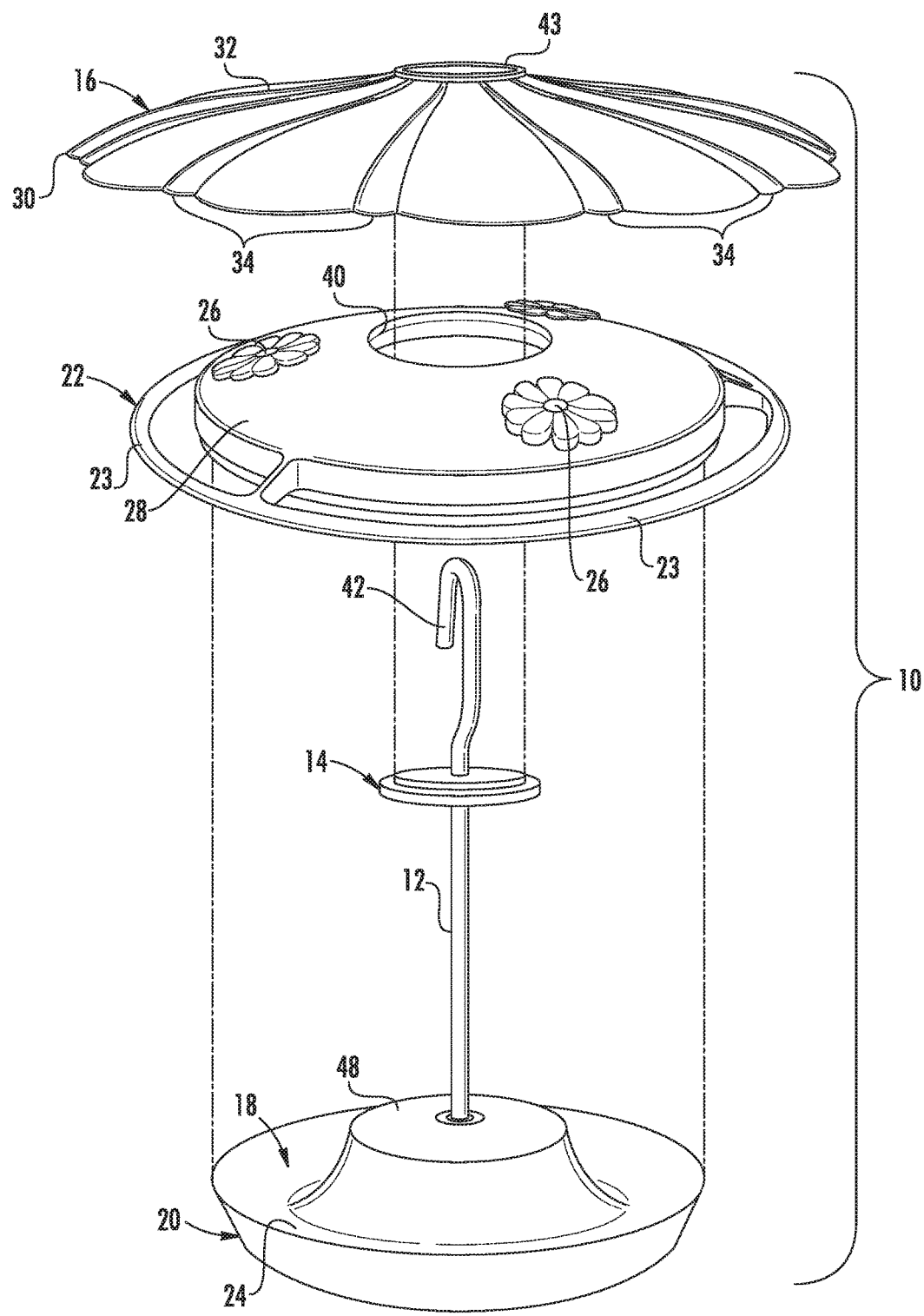
FIG. 6 is a partially exploded, perspective view of the feeder with the rain shield removed, and with the cover removed.

In FIGS. 4 and 6, there is a hook 42 that is visible at the upper end of the hanger rod 12. The hook 42 is dimensioned and configured so the hook 42 can pass through the rain shield aperture 43, having a fourth diameter D4, when the rain shield 16 is being placed on the plug 14 or when the rain shield 16 is being removed from the feeder 10 while the hanger rod 12 is secured to the base 20 and the plug 14 is secured to the hanger rod 12. The hook 42 is also dimensioned and configured so the cover 22 can be placed on the feeder 10 or can be removed from the feeder 10 while the hanger rod 12 is secured to the base 20 and the plug 14 is secured to the hanger rod 12.

As an example, the width of the hanger 12 is 1.125 inches in its widest dimension, and the second diameter is 1.75 inches.

FIG. 4 shows that the plug 14 includes a hanger receiving aperture 17 defined vertically within the plug 14. This hanger receiving aperture 17 is dimensioned and configured so the plug 14 can be positionally secured to the hanger rod 12. For example, the plug 14 is friction fit onto the outer surface of the hanger rod 12. Other methods of securing the plug 14 to the hanger rod 12 are possible.

The plug 14 has a plug main body 44 with a first diameter D1 when viewed from above, and a plug protrusion 46 that extends upwardly from the main body of the plug 14. The plug protrusion has a third diameter D3 when viewed from above. The center aperture 40 of the cover 22 has a second diameter D2, which is greater than the first diameter D1. This allows a user to move the cover 22 past the plug 14 either upwardly or downwardly, when disassembling or assembling the feeder 10, respectively.

The plug 14 is preferably made of rubber but can be made of any suitable material.

The cover 22 is releasably attached to the base 20 by a friction fit when the feeder 10 is fully assembled.

The hanger rod 12 is removably connected to the base 20 at the central portion of the base 20. For example, the hanger rod may be equipped with male threading (not shown) at its lower end for threaded engagement with female threading (not shown) at the central portion of the base 20. Such threaded engagement is well-known in the art.

The base 20 may include a central portion 48 and a trough-shaped reservoir 18 that is positioned radially about the central portion 48. The central portion 48 of the base 20 is configured to support and secure the hanger rod 12 to the base 20. Variations can be made to the base 20, the central portion 48 of the base 20, and the reservoir 18, such as dimensions and volume of liquid containable in the reservoir 18, as desired.

Figure 7:
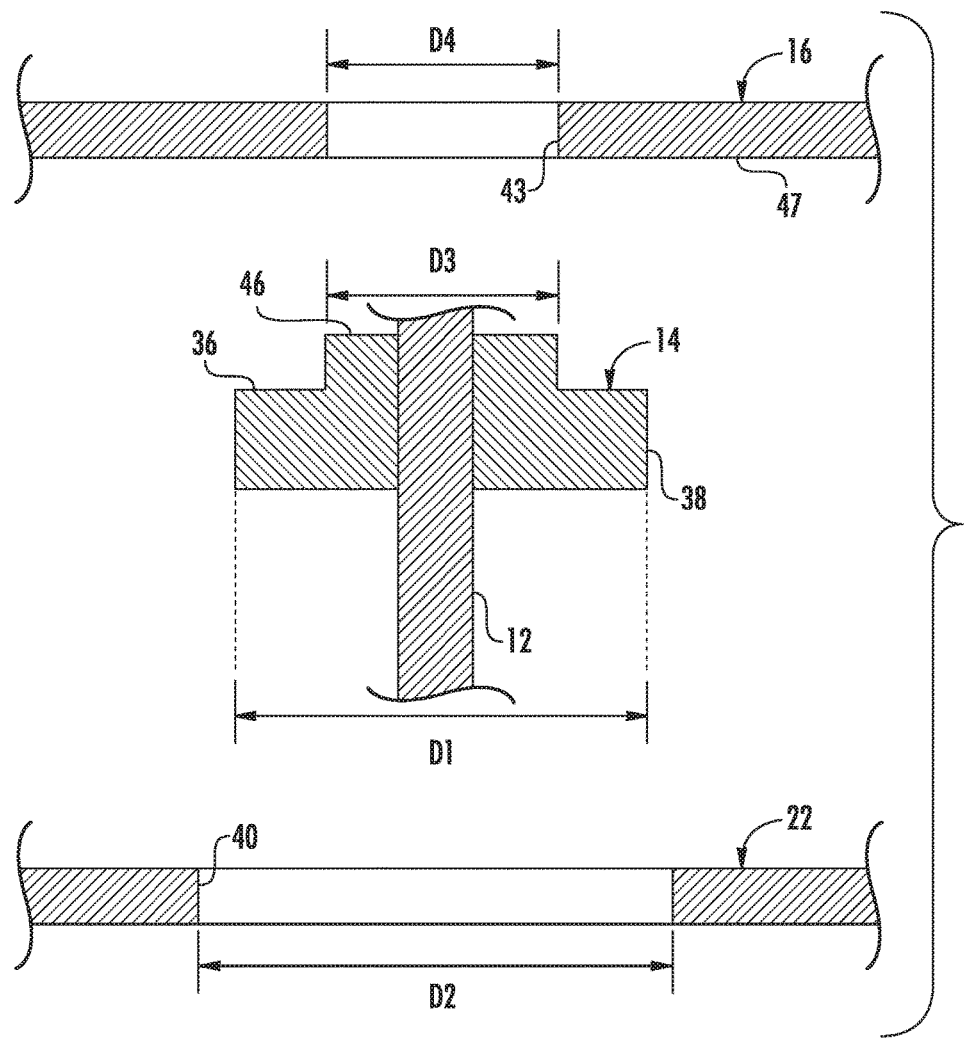
FIG. 7 shows a cross-sectional view of a portion of the feeder, to show relative dimensions of the rain shield, cover, and plug.

FIG. 7 shows an illustration of a cross-sectional view of a portion of the feeder 10, to show relative dimensions of the rain shield 16, cover 22, and plug 14. The cross section of FIG. 7 is taken through the vertical axis of the hanger rod 12. The illustration in FIG. 7 is exaggerated and not to scale of the feeder shown in FIGS. 1-6, therefore, the absolute dimensions are not identical. The exaggeration of the elements in FIG. 7 is for illustrative purposes to convey the relation of the parts of the feeder 10 shown in FIGS. 1-6.

As noted above, the plug 14 has a main body 44 with an outer diameter defined as a first diameter, or D1. A cover aperture 40 is defined on the cover 22, and the cover aperture 40 has a second diameter, or D2. The second diameter, D2, is greater than the first diameter, D1, permitting the cover 22 to be easily removed from the base 20 by allowing the cover aperture 40 to clear the main body 44 of the plug 14.

Figure 8:
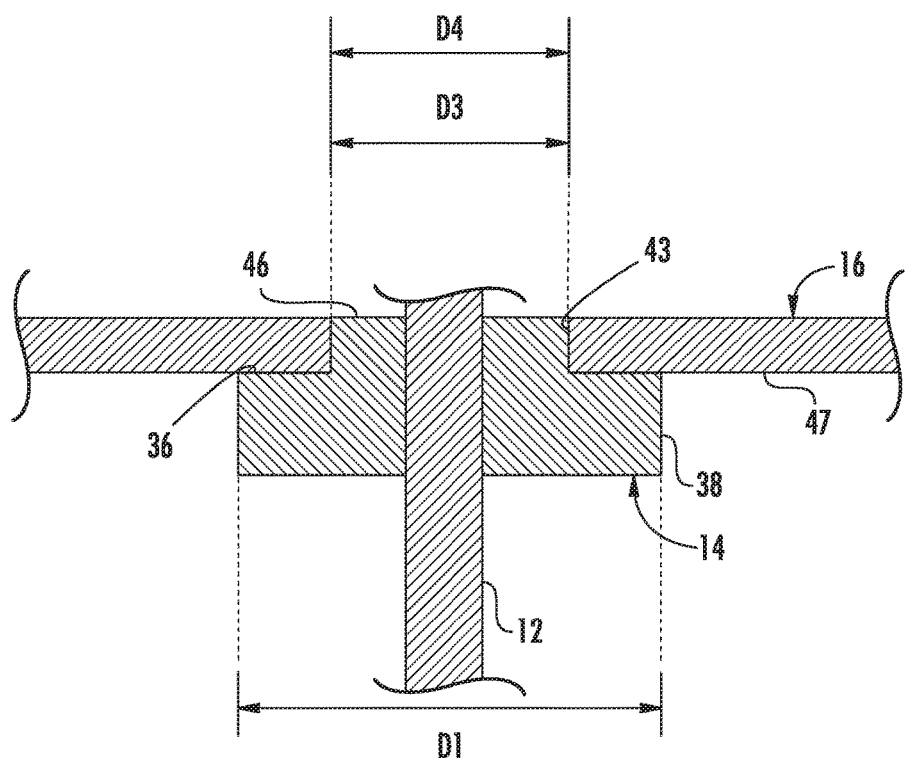
FIG. 8 shows a cross-sectional view of a portion of the feeder, to show the engagement of the rain shield with the plug.

Referring to FIGS. 7 and 8, the plug protrusion 46 extends upwardly from the main body 44 of the plug 14, and the plug protrusion 46 has an outer diameter defined as a third diameter, or D3. A rain shield aperture 43 is defined in the rain shield 16, and is dimensioned and configured so the rain shield 16 can be secured to the plug protrusion 46 by, preferably, a friction fit between the plug protrusion 46 and the rain shield aperture 43. This is possible due to the softness of the rubber plug material. The rain shield aperture 43 has a diameter D4, which provides a friction fit with the plug protrusion having diameter D3. However, it should be noted that a friction fit is not required, and other structures may be used, such as a snap-fit or twist-to-lock configuration may be used (not shown). The plug 14 may be of a hard or rigid material and dimensioned to receive the rain shield 16 via the rain shield aperture.

The main body 44 and the plug protrusion 46 provide a stepped upper surface, so that the main body 44 forms a shoulder 36 vertically recessed from the plug protrusion 46. The plug protrusion 46 is narrower than the plug main body 44. Thus, the third diameter D3 is less than the first diameter D1. When the rain shield 16 is secured to the plug 14, a lower surface 47 of the rain shield 16 is preferably in direct facing engagement with the shoulder surface 36 formed by the plug main body 44. The shoulder surface 36 and the upper protrusion surface together define the upper surface of the plug.

The plug 14 and the rain shield 16 thus cooperate to form a seal at the engagement of the plug protrusion 46 and the shoulder 36 of the main body 44 with the rain shield aperture 43 and the lower surface 47 of the rain shield 16, respectively. Thus, the rain shield 16 prevents rain from falling vertically downward onto the cover 22 and onto the central portion of the base.

It can therefore be seen that the disclosed bird feeder provides a bird feeder with an improved rain shield; provides a feeder having a rain shield that is removably supported above the reservoir of the feeder; provides a hanger rod having a plug that supports a rain shield above the base of a feeder and that allows a user to pass the cover over the plug to access the reservoir in the base; provides a plug that provides a friction fit for a rain shield above a base and cover; and provides a rain shield that prevents rain from falling on the upper surface of the cover and on the central portion of the base. For these reasons, the disclosed feeder is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A nectar bird feeder, comprising:
    a base, the base having a bottom surface and a reservoir for containing nectar therein;
    a hanger rod connected to the base and extending upwardly from the base;
    a cover releasably attached to the base;
    a plug secured to the hanger rod and positioned on the hanger rod so the plug is above the cover when the cover is attached to the base; and
    a rain shield removably supported by the plug,
    wherein the plug has a circular peripheral edge of a first diameter, the first diameter being the largest diameter of the plug; wherein a center through hole is defined through the cover, and the center through hole has a second diameter;
    wherein the second diameter is greater than the first diameter, and
    wherein the circular peripheral edge of the plug and the center through hole of the cover being dimensioned and configured so that the cover can be removed from the base of the feeder while the hanger rod is secured to the base and the plug is secured to the hanger rod above the base and the cover.

2. The feeder of claim 1, wherein the plug has an upper surface that supports the rain shield.

3. The feeder of claim 1, wherein the second diameter is approximately 1.75 inches, and the first diameter is no greater than approximately 1.5 inches.

4. The feeder of claim 1, further comprising:
    a hook at an upper end of the hanger rod, the hook being dimensioned and configured so the hook can pass through a rain shield aperture defined in the rain shield, and so the hook can pass through the center through hole of the cover while the hanger rod is secured to the base.

5. The feeder of claim 4, wherein the width of the hanger is approximately 1.125 inches.

6. The feeder of claim 1, wherein the plug further comprises:
    a plug main body defined by the circular peripheral edge having the first diameter;
    a plug protrusion extending upwardly from the plug main body, the plug protrusion having a third diameter that is less than the first diameter;
    a hanger receiving aperture defined vertically within the plug, the hanger receiving aperture being dimensioned and configured so the plug can be positionally secured to the hanger rod;
    wherein a rain shield aperture is defined on the rain shield and is dimensioned and configured to be secured to the plug protrusion by a friction fit.

7. The feeder of claim 1, wherein the plug is made of rubber.

8. The feeder of claim 1, wherein the cover is releasably attached to the base by a friction fit.

9. The feeder of claim 1, wherein the hanger is removably connected to the base.

10. The feeder of claim 1, wherein the base includes a central portion, and the reservoir is trough-shaped and positioned about the central portion.

* * * * *